US008821349B2

(12) United States Patent
Cunningham et al.

(10) Patent No.: US 8,821,349 B2
(45) Date of Patent: *Sep. 2, 2014

(54) METHOD AND SYSTEM FOR CONTROLLING ENGINE AIR

(71) Applicant: Ford Global Technologies, LLC, Dearborn, MI (US)

(72) Inventors: Ralph Wayne Cunningham, Milan, MI (US); Ross Dykstra Pursifull, Dearborn, MI (US); Mansour Beshay, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/732,165

(22) Filed: Dec. 31, 2012

(65) Prior Publication Data
US 2013/0123067 A1    May 16, 2013

Related U.S. Application Data

(63) Continuation of application No. 12/862,067, filed on Aug. 24, 2010, now Pat. No. 8,343,011.

(51) Int. Cl.
*F02D 9/06*    (2006.01)
*B60T 13/72*   (2006.01)
*B60T 17/02*   (2006.01)
*B60W 10/06*   (2006.01)
*F02D 41/00*   (2006.01)
*F02D 41/18*   (2006.01)

(52) U.S. Cl.
CPC ........ *B60W 10/06* (2013.01); *F02D 2200/0402* (2013.01); *B60T 13/72* (2013.01); *F02D 2250/41* (2013.01); *F02D 41/0002* (2013.01); *B60T 17/02* (2013.01); *F02D 41/187* (2013.01); *B60W 2710/0605* (2013.01); *F02D 2200/0406* (2013.01); *B60W 2540/12* (2013.01)
USPC ........................................................ 477/206

(58) Field of Classification Search
USPC ..................................... 477/33, 203, 205, 206
See application file for complete search history.

(56) References Cited

U.S. PATENT DOCUMENTS

| 2,264,126 A | 11/1941 | Wydler |
| 2,721,629 A | 5/1949 | Saussard |
| 3,763,974 A | 10/1973 | Neal |
| 4,192,278 A * | 3/1980 | Iizuka et al. ............... 123/198 F |

(Continued)

FOREIGN PATENT DOCUMENTS

JP    2005171925 A    6/2005

OTHER PUBLICATIONS

Vetrovec, John, "Fluid-Dynamic Supercharger", SAE Technical Paper Series 2008-01-0299; World Congress, Detroit Michigan, Apr. 14-17, 2008; 15 Pgs.

*Primary Examiner* — Robert A Siconolfi
*Assistant Examiner* — Huan Le
(74) *Attorney, Agent, or Firm* — Julia Voutyras; Alleman Hall McCoy Russell & Tuttle LLP

(57) ABSTRACT

An engine with a fast vacuum recovery brake booster system is disclosed. In one example, an actuator is adjusted in response to a flow between the brake booster and an engine intake manifold. Operation of the engine and vehicle brakes may be improved especially when the engine is boosted.

18 Claims, 8 Drawing Sheets

(56) References Cited

U.S. PATENT DOCUMENTS

| | | | |
|---|---|---|---|
| 4,211,200 A | 7/1980 | Rocchio et al. | |
| 4,541,396 A | 9/1985 | Sato et al. | |
| 5,005,550 A | 4/1991 | Bugin, Jr. et al. | |
| 5,826,559 A | 10/1998 | Ichimoto et al. | |
| 5,950,595 A * | 9/1999 | Yoshioka et al. | 123/295 |
| 6,095,116 A * | 8/2000 | Matsushita et al. | 123/350 |
| 6,109,028 A | 8/2000 | Streib | |
| 6,321,716 B1 * | 11/2001 | Mashiki et al. | 123/295 |
| 6,412,455 B1 | 7/2002 | Ogiso et al. | |
| 6,513,484 B1 | 2/2003 | Buckland et al. | |
| 6,557,524 B2 * | 5/2003 | Tsunooka | 123/399 |
| 6,732,504 B2 | 5/2004 | Majima et al. | |
| 6,951,199 B2 | 10/2005 | Suzuki | |
| 7,040,719 B2 | 5/2006 | Collins et al. | |
| 7,174,883 B2 | 2/2007 | Sonoda et al. | |
| 7,610,140 B2 | 10/2009 | Hirooka | |
| 7,813,867 B2 * | 10/2010 | Yasui et al. | 701/103 |
| 8,087,397 B2 | 1/2012 | Cunningham et al. | |
| 8,230,675 B2 | 7/2012 | Pursifull et al. | |
| 2002/0013196 A1 | 1/2002 | Almkvist et al. | |
| 2004/0182363 A1 | 9/2004 | Suzuki | |
| 2005/0000769 A1 | 1/2005 | Hawener et al. | |
| 2007/0293994 A1 | 12/2007 | Zerbini et al. | |
| 2007/0295303 A1 | 12/2007 | Hirooka | |
| 2008/0046143 A1 | 2/2008 | Tagami et al. | |
| 2008/0065310 A1 | 3/2008 | Trask et al. | |
| 2008/0121480 A1 | 5/2008 | Kawamori et al. | |
| 2008/0264059 A1 | 10/2008 | Hirooka | |
| 2008/0267789 A1 | 10/2008 | Hirooka | |
| 2010/0298095 A1 | 11/2010 | Wang et al. | |
| 2010/0300413 A1 | 12/2010 | Ulrey et al. | |
| 2011/0132311 A1 | 6/2011 | Pursifull et al. | |
| 2011/0203269 A1 | 8/2011 | Karnik et al. | |
| 2012/0016566 A1 | 1/2012 | Cunningham et al. | |
| 2012/0237365 A1 | 9/2012 | Ulrey et al. | |
| 2012/0237366 A1 | 9/2012 | Pursifull | |
| 2012/0237367 A1 | 9/2012 | Cunningham et al. | |
| 2012/0237368 A1 | 9/2012 | Pursifull et al. | |

* cited by examiner

METHOD AND SYSTEM FOR CONTROLLING ENGINE AIR

CROSS REFERENCE TO RELATED APPLICATIONS

The present application is a continuation of U.S. patent application Ser. No. 12/862,067 filed Aug. 24, 2010, the entire contents of which are incorporated herein by reference for all purposes.

BACKGROUND/SUMMARY

Assisting a driver to increase braking force applied to a vehicle is known. In particular, engine intake manifold vacuum is used within a brake booster to increase the force a driver applies to a brake pedal to actuate vehicle brakes. Vacuum in the brake booster is used to augment vehicle brake force each time the vehicle brake pedal is applied. However, boosted engines are sometimes operated where the engine intake manifold is at a positive pressure rather than a vacuum. Thus, it may be difficult to provide vacuum to the brake booster to assist the driver under some operating conditions. Further, even when there is intake manifold vacuum, the intake manifold vacuum may not be present long enough for brake booster vacuum to recover internal vacuum such that the brake booster provides a desired amount of brake force augmentation to the driver the next time the vehicle brakes are applied.

The inventors herein have recognized the issues of vacuum assisted brakes in boosted engines and have developed an interconnection between the intake manifold and the brake booster that allows for an improved rate of vacuum recovery within the brake booster. By improving the vacuum recovery rate of the brake booster it may be possible to eliminate a vacuum pump on a boosted engine. However, improving a rate of vacuum recovery in a brake booster can also produce engine air amount disturbances (e.g., un-throttled air flow rate) as air is exchanged from the brake booster to the engine intake manifold. And, engine air amount disturbances can increase engine emissions and may be noticeable to the driver.

By adjusting an actuator in response to a brake booster to intake manifold flow rate, it may be possible to provide brake booster vacuum while limiting engine emissions and driver disturbances. For example, a driver may repeatedly accelerate and brake a vehicle during the course of driving. When the driver releases the throttle to brake there may be a brief opportunity to recharge the brake booster with vacuum. If the engine throttle is adjusted in response to a brake booster to intake manifold flow rate, the intake manifold pressure rate of change may be limited or substantially maintained at a constant pressure so that changes in engine operation are mitigated. In one example, an intake throttle can be closed (e.g., partially or fully) when the brake booster is replenished with vacuum from the intake manifold. In this way, the throttle position is adjusted to compensate for flow from the brake booster.

The present description may provide several advantages. For example, the approach may reduce system costs of a boosted engine by eliminating or reducing the size of a system vacuum pump. Further, the approach can improve engine emissions and reduce engine air disturbances when replenishing vacuum to a brake booster.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
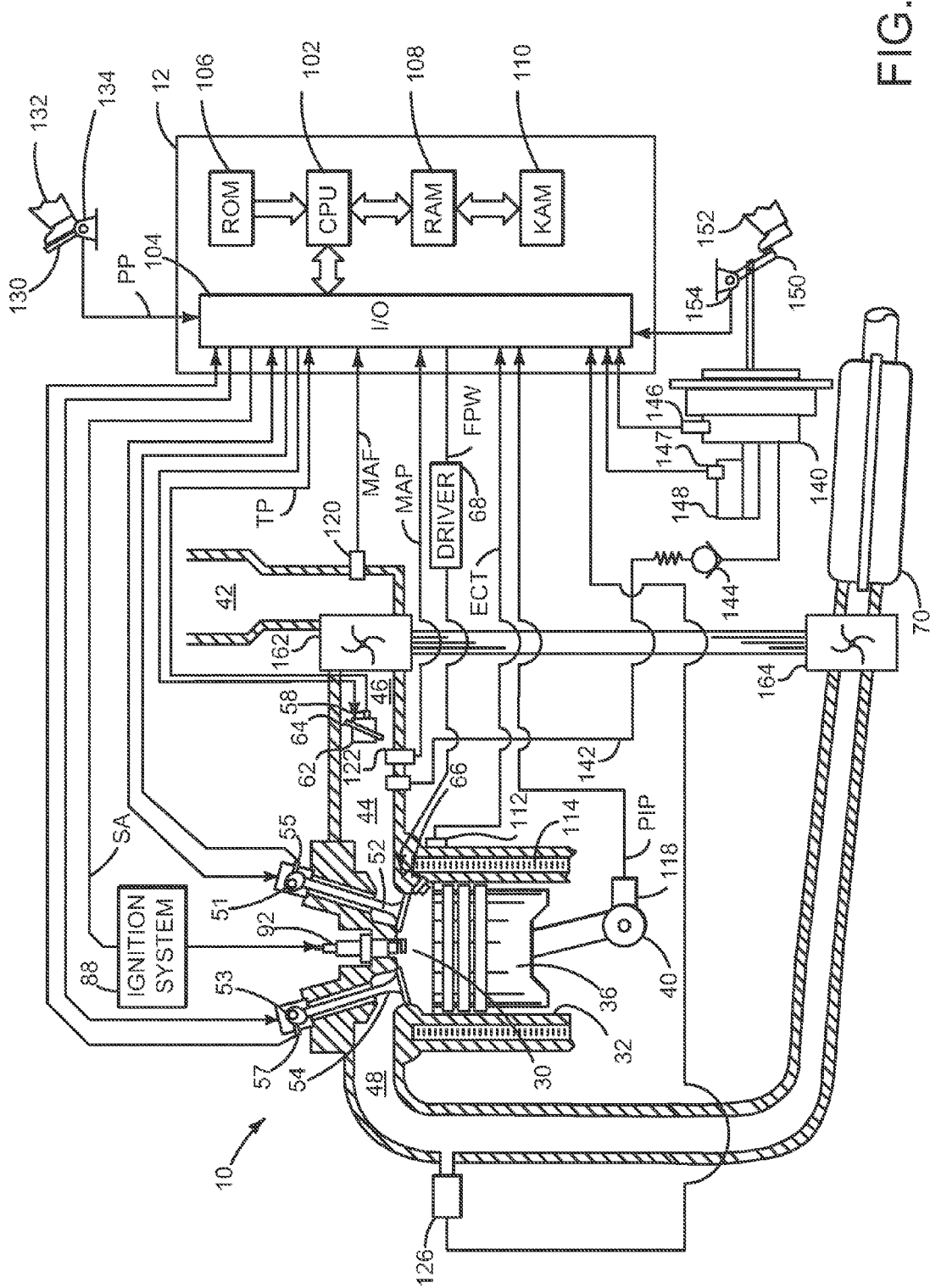
FIG. 1 shows a schematic depiction of an engine.

The present description is related to compensating for and providing vacuum to a brake booster. In one example, a passage or conduit provides a high flow capacity link between a brake booster and an engine air intake passage. FIG. 1 shows one example embodiment of the brake booster system.

Figure 2:
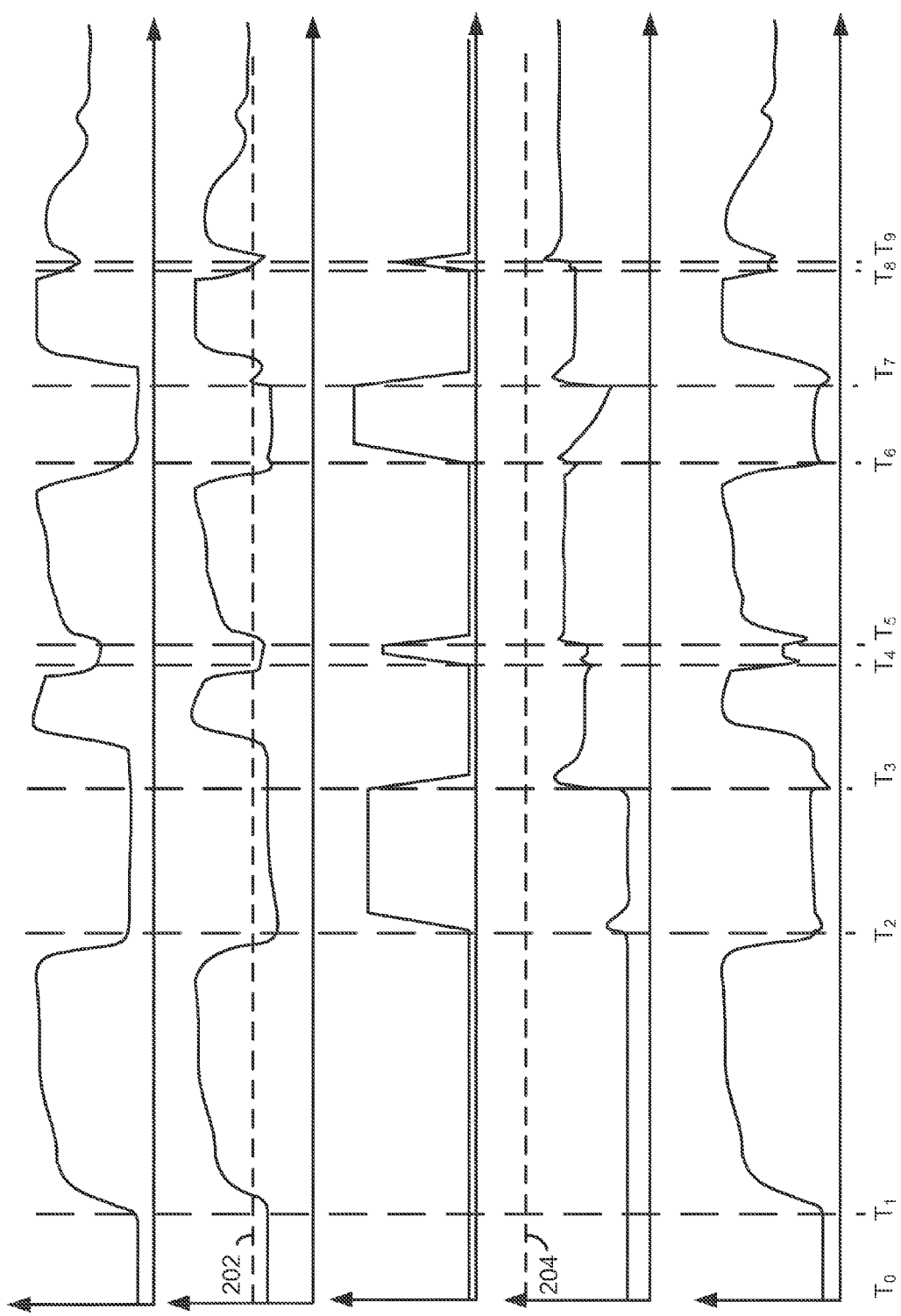
FIG. 2 shows simulated signals of interest during a vehicle drive cycle.
Figure 3:
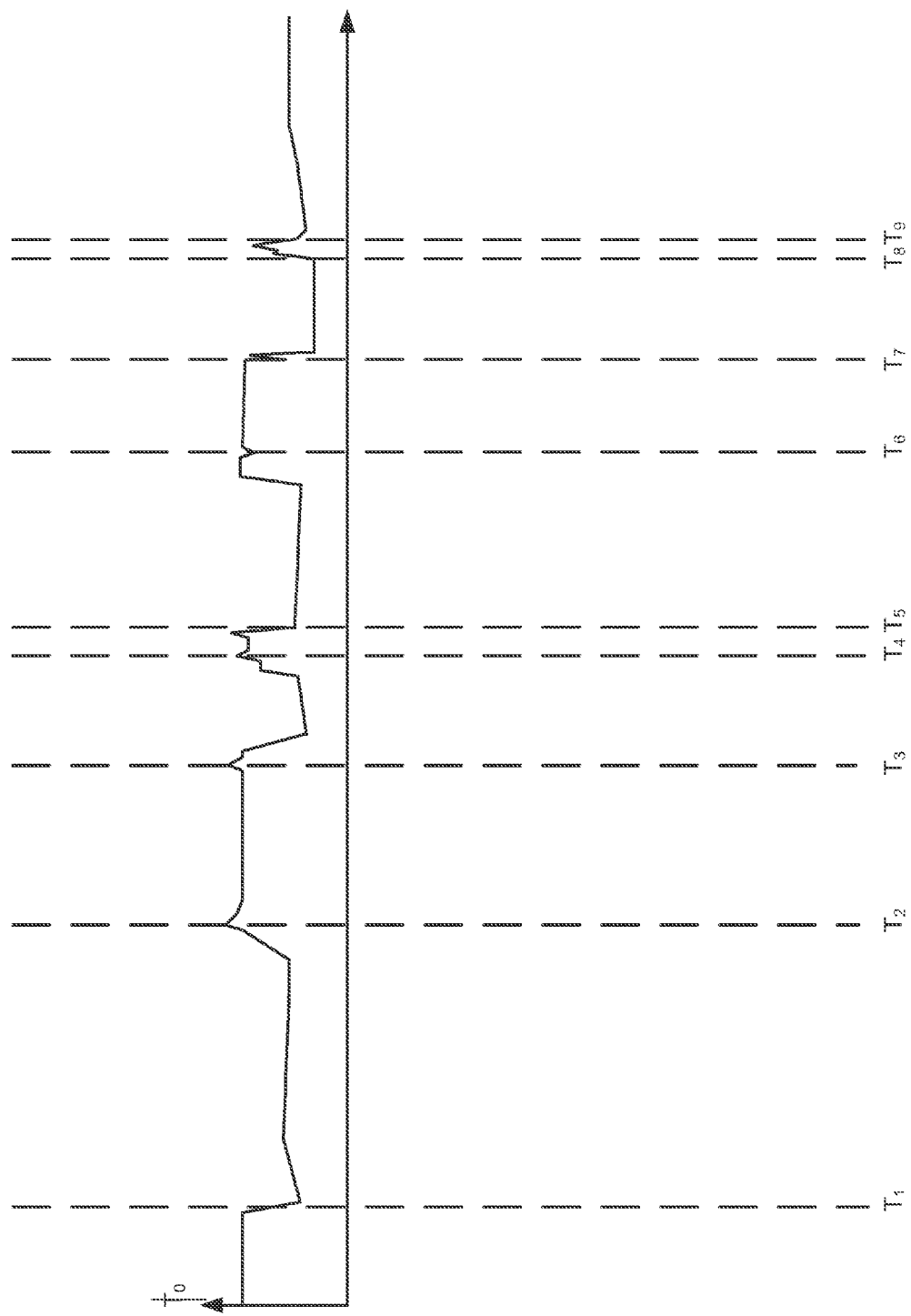
FIG. 3 shows further simulated signals of interest during the vehicle drive cycle shown in FIG. 2.
Figure 5:
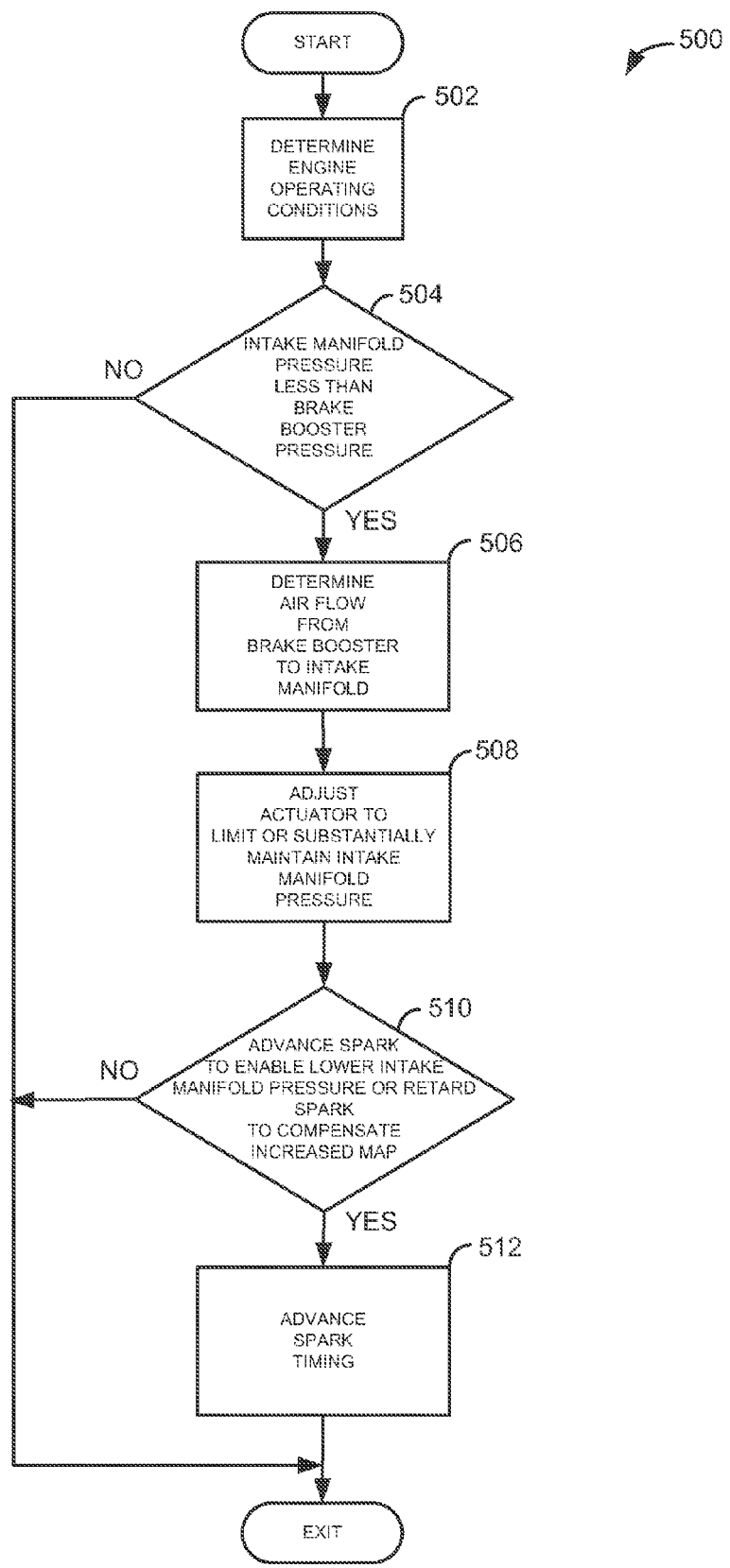
FIG. 5 shows a flowchart of a first example method for compensating air flow from a brake booster to an engine air intake system.
Figure 6:
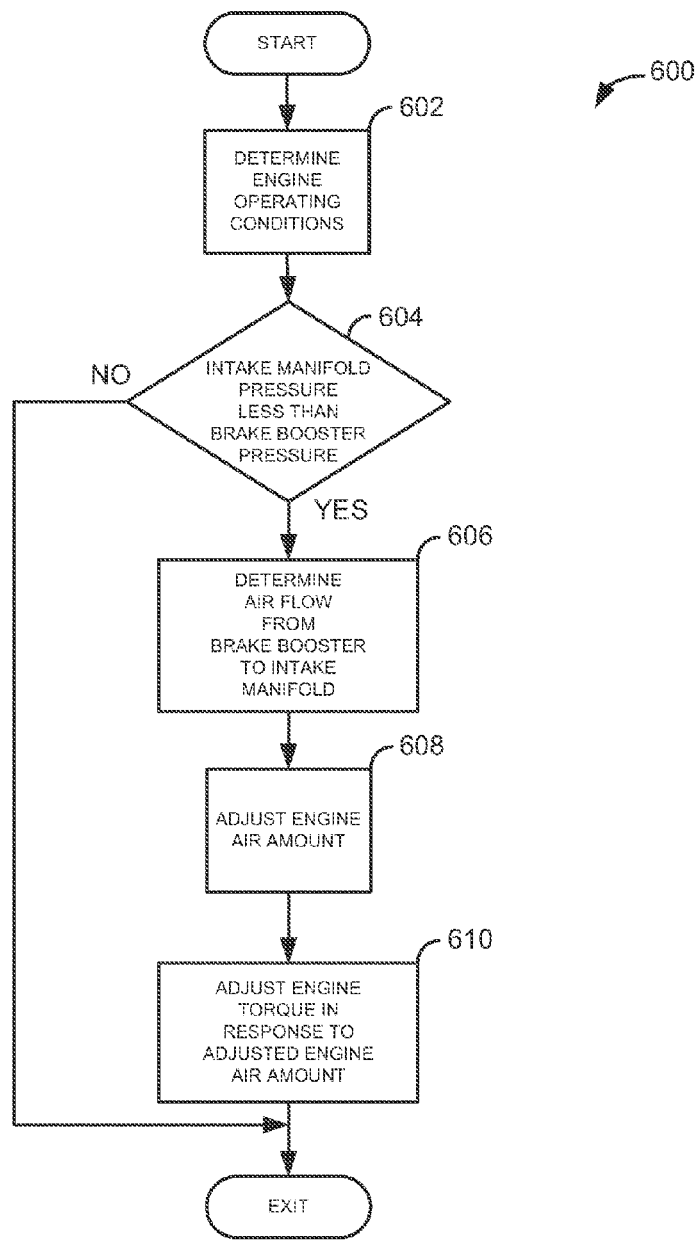
FIG. 6 shows a flowchart of a second example method for compensating for air flow from a brake booster to an engine air intake system.

FIGS. 2-3 show simulated signals of interest for a brake boost system during a drive cycle. FIGS. 4A-4D show two example sonic orifices for controlling flow from a brake booster to an engine air intake system. FIGS. 5-6 show two different methods for compensating for a high flow brake boost system.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162. A high pressure, dual stage, fuel system may be used to generate higher fuel pressures at injectors 66. Intake manifold 44 also provides vacuum to brake booster 140 via conduit 142. Check valve 144 ensures air flows from brake booster 140 to intake manifold 44 and not from intake manifold 44 to brake booster 140. Brake booster 140 amplifies force provided by foot 152 via brake pedal 150 to master cylinder 148 for applying vehicle brakes (not shown).

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position, a pressure sensor 146 for sensing brake booster vacuum; a pressure sensor 147 for sensing master cylinder pressure (e.g., hydraulic brake pressure); a knock sensor for determining ignition of end gases (not shown); a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Thus, the system of FIG. 1 provides for an engine system, comprising: an engine having an intake manifold; a first sensor configured to sense an attribute of air in an intake system of the engine; a brake booster; a second sensor configured to sense a pressure of the brake booster; a conduit coupling the intake manifold and the brake booster; a venturi or a sonic choke positioned along the conduit; an actuator coupled to the engine; and a controller, the controller including instructions for adjusting the actuator in response to a flow estimated with the first and second sensors. The engine system including where the actuator is at least one of an intake throttle, an EGR valve, a PCV valve, and a throttle bypass valve. The engine system includes where the first sensor is a hot wire air flow meter. The engine system includes where the first sensor is an intake manifold pressure sensor. The engine system includes where the controller includes further instructions for adjusting engine spark in response to the flow estimated with the first and second sensors. The engine system includes where the controller includes further instructions for substantially maintaining engine torque when adjusting the actuator. The engine system includes where the controller includes further instructions for closing the actuator when brake booster pressure rises in response to depressing a brake pedal, and where the controller includes further instructions for closing the actuator when brake booster pressure rises in response to releasing a brake pedal. Air actuators (e.g., throttles, bypass valves, crankcase ventilation valves, fuel vapor purge valves) are manipulated to reduce air flow rate into the intake manifold to keep MAP substantially constant. Further, ignition timing is retarded to reduce and torque or speed flares not fully compensated by the air actuators or advanced to allow additional engine throttling when appropriate.

Referring now to FIGS. 2-3, simulated signals of interest during an engine operating sequence are shown. FIG. 2 shows five signals of interest during the engine operating sequence. Vertical markers $T_0$-$T_9$ identify particular times of interest during the operating sequence.

The first plot from the top of FIG. 2 shows desired engine torque versus time. Time starts at the left side of the plot and increases to the right. Desired engine torque is at its lowest value at the bottom of the plot and increases in magnitude toward the top of the plot.

The second plot from the top of FIG. 2 shows engine intake manifold pressure versus time. Time starts at the left side of the plot and increases to the right. Engine intake pressure is at its lowest value at the bottom of the plot and increases toward the top of the plot. Horizontal marker 206 represents atmospheric pressure in the second plot. Thus, when manifold pressure is above marker 206 the intake manifold is at a positive pressure. When manifold pressure is below marker 206 the intake manifold is at a vacuum.

The third plot from the top of FIG. 2 shows brake pedal position versus time (e.g. element 154 of FIG. 1). Time starts at the left side of the plot and increases to the right. When the brake pedal position is low, the brake pedal is not activated. When the brake pedal signal is high, the brake pedal is activated.

The fourth plot from the top of FIG. 2 shows brake booster pressure versus time. Time starts at the left side of the plot and increases to the right. Horizontal marker 204 represents atmospheric pressure in the fourth plot. A brake booster pressure below atmospheric pressure can provide brake force to assist the driver. Brake booster pressure is at higher level at the top of the plot. Brake booster pressure is at a higher level of vacuum at the bottom of the plot.

The fifth plot from the top of FIG. 2 shows engine intake throttle position versus time (e.g. element 58 of FIG. 1). Time starts at the left side of the plot and increases to the right. The throttle is just partially open at the bottom of the plot and the throttle opening area increases in the direction toward the top of the plot.

The first plot from the top of FIG. 3 shows engine spark advance versus time. Time starts at the left side of the plot and increase to the right. The engine spark is most retarded at the bottom of the plot and engine spark is most advanced toward the top of the plot.

At time $T_0$, the engine is operating at a low desired engine torque condition, idle for example. Further, the intake manifold pressure is at a vacuum condition, the vehicle brake is not actuated, the brake booster vacuum is at a higher level, the engine intake throttle is mostly closed, and the spark is advanced.

At time $T_1$, desired engine torque begins to increase and stays at a higher level until just before time $T_2$ where it is reduced. Intake manifold pressure begins at a vacuum condition and is transitioned to a positive pressure condition. The vehicle brake is not applied from $T_1$ to $T_2$. The brake booster pressure is maintained at a constant level from $T_1$ to $T_2$ since the brake is not actuated and air flow from the intake manifold to the brake booster is limited by a check valve (e.g., element 144 of FIG. 1). The engine throttle position follows a trajectory that is similar to the desired engine torque from time $T_1$ to $T_2$. From time $T_1$ to $T_2$, the engine throttle position and desired engine torque follow a trajectory representative of vehicle acceleration. Engine spark is retarded from the spark timing shown at $T_0$ between time $T_1$ and $T_2$ to reflect engine operation at a higher load.

At time $T_2$, the desired engine torque is at a low level indicating that the vehicle is at idle, decelerating, or coasting. Intake manifold pressure falls with the drop in desired engine torque just before time $T_2$, and intake manifold pressure is at a vacuum just before time $T_2$. The vehicle brake is applied at time $T_2$ as indicated by the change in brake position. Engine throttle position is reduced before time $T_2$ in response to a driver requesting less engine torque. Engine throttle position is further reduced at time $T_2$ in response to application of the vehicle brake. When the vehicle brake is applied, brake booster pressure increases as a diaphragm in the brake booster compresses the brake booster vacuum chamber. Accordingly, the brake booster pressure increases at $T_2$ and subsequently starts to decrease until time $T_3$ as the check valve opens to equalize the pressure between the brake booster vacuum chamber and the intake manifold. When brake booster pressure is at a higher pressure than the intake manifold, flow is permitted from the brake booster to the intake manifold by the check valve. Atmospheric pressure also flows to the brake pedal side of the brake booster diaphragm when the brake is applied at $T_2$. Atmospheric pressure on the brake pedal side of the brake booster diaphragm further increases force applied by the driver to the master brake cylinder. Spark is advanced at time $T_2$ so that engine torque is substantially maintained while the throttle position and throttle opening area are reduced.

In between time $T_2$ and time $T_3$, the brake pedal position remains substantially constant after the initial brake application up to brake release at time $T_3$. Further, desired engine torque, intake manifold pressure, throttle position, and engine spark timing remain substantially constant after compensating for vehicle brake application at time $T_2$. The brake booster pressure also decreases until the brake booster pressure approaches the engine intake manifold pressure.

At time $T_3$, the vehicle brake is released while the desired engine torque remains substantially constant and at a lower level. When the vehicle brake is released, a valve within the brake booster closes the brake pedal side of the brake booster diaphragm to atmospheric pressure and exposes the brake pedal side of the brake booster diaphragm to brake booster pressure on the master cylinder side of the diaphragm. A flow limiting orifice limits air flow from the brake pedal side of the brake booster diaphragm to the master cylinder side of the brake booster diaphragm. By exposing the brake pedal side of the brake booster diaphragm to the master cylinder side of the brake booster diaphragm, air that was allowed to act on the brake booster diaphragm during brake application is allowed into the brake booster vacuum chamber. Thus, the pressure difference across the diaphragm transitions to substantially zero over several tenths of a second. Accordingly, the brake booster pressure increases at time $T_3$ increasing flow from the brake booster to the intake manifold. Throttle position is changed (e.g. partially closed) in response to the increase in flow from the brake booster to the intake manifold. By changing the throttle position, the throttle opening area is reduced such that an increase in intake manifold pressure due to releasing the brake pedal can be mitigated or counteracted. In other words, the reduced throttle opening area reduces the amount of air entering the engine by way of the air intake by an amount that is substantially equal to the amount of air entering the engine via the brake booster. In this way, the intake manifold pressure is substantially maintained at a constant level so that the engine air amount and engine torque also remain substantially constant. Further, it should be noted that the desired engine torque does not follow the change in throttle position but rather remains constant since no driver input is present. Closing of the throttle compensates the effect of un-throttled air flowing from the brake booster to the intake manifold. Thus, the possibility of disturbing engine air-fuel is reduced. Also, closing the throttle has an additional benefit of improving vacuum recovery by eliminating the MAP increase. In addition, the spark can be advanced so that the throttle can be closed further to maintain or reduce intake manifold vacuum.

Between time $T_3$ and $T_4$, the throttle position increases indicating a request for more engine torque from the driver. The desired engine torque and intake manifold pressure also increase so that the vehicle will accelerate, for example. When the intake manifold pressure rises above atmospheric pressure the brake booster pressure is not decreased because the intake manifold pressure is greater than the brake booster pressure. Engine spark is retarded to reflect the higher engine load. Just prior to time $T_4$, the desired engine torque is reduced to reflect a lower driver demand. As a result, the intake manifold pressure is also reduced.

At time $T_4$, the vehicle brake is applied. Once again, the brake booster pressure increases when the brake is applied. The throttle position is reduced to compensate for the increased brake booster pressure. Further, the spark is advanced so that the throttle can be closed further to increase intake manifold vacuum while maintaining engine torque. The desired engine torque is low at time $T_4$, but it is not as low as at idle conditions. Therefore, it may take more time to develop vacuum in the intake manifold. As a result, the brake booster vacuum may not recover in systems where a restriction substantially limits flow between the brake booster vacuum chamber and the brake booster. However, in systems where a high level of flow is permitted, such as is described in the present disclosure, brake booster vacuum can recover at an improved rate. Adjusting the engine throttle, EGR valve, or other actuator to compensate for air flow from the brake booster to the intake manifold can compensate for the higher air flow rate between the brake booster and the intake manifold. In this example, the increase in brake booster pressure is partially reduced by drawing some air from the brake booster to the intake manifold.

At time $T_5$, the vehicle brake is released and the engine throttle opening area is further reduced to compensate for increased air flow from the brake booster to the intake manifold. Further, almost simultaneously, the desired engine torque increases in response to a driver torque demand. When the desired engine torque increases the intake manifold pressure also increases so that the brake booster vacuum does not have time to fully recover. Thus, brake booster pressure remains at a higher lever from $T_5$ to $T_6$. However, the brake booster has reserve volume so that brake booster vacuum is still available to assist in application of the vehicle brakes at $T_6$. Spark is also advanced at $T_5$ to compensate for a reduction in engine air amount so that a change in engine torque is limited. Thus, FIG. 2 show a braking operation where a vehicle brake is applied and quickly released between time $T_4$ and $T_5$.

Between time $T_5$ and $T_6$, desired engine torque increases and then decreases. Desired engine torque decreases just before $T_6$ to a level where the engine partially evacuates the intake manifold of air. Spark is advanced as desired engine load decreases to reflect a lower engine load.

At time $T_6$, the vehicle brake is applied. Brake booster pressure increases in response to application of the vehicle brake. Since the desired engine torque and manifold pressure are low at $T_6$, air is drawn from the brake booster thereby decreasing the brake booster pressure even though the vehicle brake is applied. However, intake manifold pressure increases slightly at this condition so spark is retarded to provide substantially the desired engine torque. The throttle position is adjusted when the brake is applied and an increase in flow from the brake booster to the intake manifold is detected.

Thus, the brake application and release illustrated between times $T_3$ and $T_6$ represents a quick brake action by a driver that actively switches between acceleration and vehicle braking In addition, a condition where brake booster vacuum does not fully recover is shown.

Between $T_6$ and $T_7$, the brake booster pressure approaches intake manifold pressure. However, the brake booster pressure does not reach the reach the lowest intake manifold pressure before the vehicle brake is released at $T_7$.

At time $T_7$, the vehicle brake is released. As the brake booster pressure approaches intake manifold pressure, the vehicle brake is released causing the brake booster pressure to increase once again. The throttle position is adjusted when the brake is released and an increase in flow from the brake booster to the intake manifold is detected. In particular, the throttle opening area is also reduced at $T_7$ to limit intake manifold pressure, however, the intake manifold pressure increases and as a result spark is retarded to control engine torque. Thus, spark can be advanced as shown at $T_7$ to substantially maintain engine torque.

Between time $T_7$ and $T_8$, engine desired torque is increased and then decreased before $T_8$. Intake manifold pressure is also increased so that engine torque output may be increased. Brake booster pressure remains at a higher level since the engine intake manifold pressure is at a level where flow from the brake booster to the intake manifold is limited.

At time $T_8$, the vehicle brake is applied and then released shortly thereafter at $T_9$. The brake is shown lightly applied for a short duration. In this example, little ambient air is applied to the brake booster diaphragm on the brake pedal. Thus, the brake booster pressure does not increase much when the brake is applied and released. As a result, there is little air flow from the brake booster to the intake manifold. Consequently, the throttle adjustment to compensate for air flow from the brake booster to the intake manifold is reduced. Thus, the change in throttle position may be proportional to the change in air flow from the brake booster to the intake manifold.

Figure 4A:
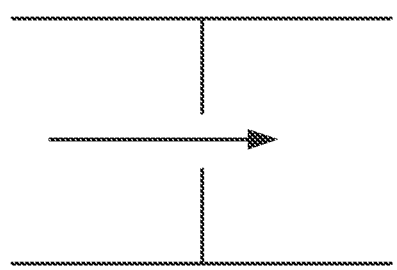
FIGS. 4A-4F show example sonic orifices and flow plots.
Figure 4B:
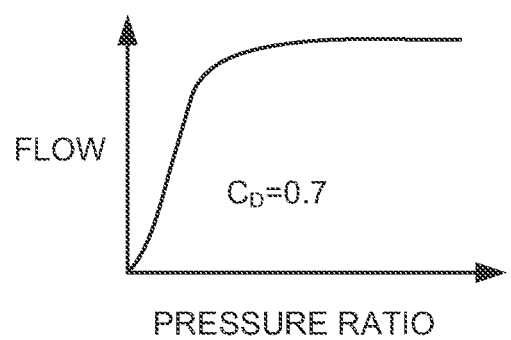

Referring now to FIGS. 4A-4D, examples of orifices and flow plots are shown. FIG. 4A shows a cross section of a sharp edge orifice. The orifice of FIG. 4A has flow characteristics as shown in FIG. 4B. When a predefined pressure ratio develops across the orifice, flow through the orifice becomes choked. Thus, flow through the orifice can be easily determined when the predefined pressure ratio is met or exceeded. If the orifice of FIG. 4A is installed in a conduit between a brake booster and an intake manifold, it can simplify adjusting an actuator to compensate for air flow between the brake booster and the intake manifold. For example, if choked flow develops across an orifice, a throttle actuator can be adjusted by an amount that limits air flow into the intake manifold equivalent to the known flow through the orifice.

Figure 4C:
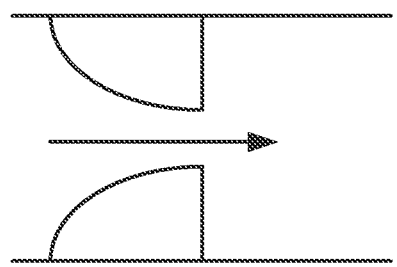
Figure 4D:
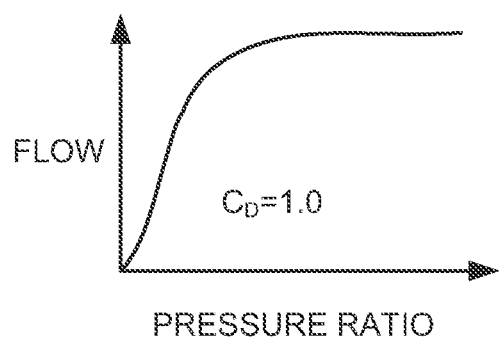

FIG. 4C shows a cross section of a bell mouth orifice. The orifice of FIG. 4C has flow characteristics as shown in FIG. 4D. Similar to the sharp edged orifice, the bell mouth orifice chokes flow when a predetermined pressure ratio is reached. Thus, like the orifice of FIG. 4A, the orifice of FIG. 4C can simplify control of an actuator to compensate for air flow from a brake booster to an intake manifold.

Figure 4E:
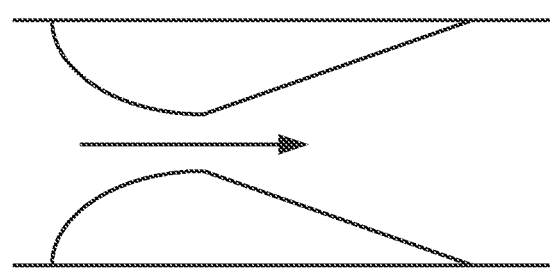
Figure 4F:
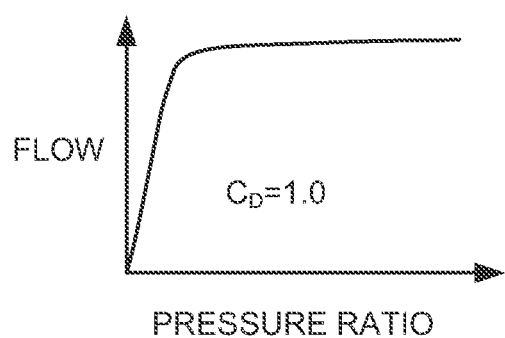

Referring to FIGS. 4E and 4F, a sonic choke is shown. A sonic choke achieves air flow rate clipping at a lower pressure ratio than the sharp-edged orifice or the bell-mouthed orifice. Compared to orifices not having a diverging cone providing pressure recovery, the sonic choke clips maximum flow rate while having a minimal effect on flows less than maximum. The sonic choke of FIG. 4E can be placed between the brake booster and the engine intake manifold to control air flow.

Referring now to FIG. 5, a method for compensating air flow from a brake booster is shown. The method of FIG. 5 is executable by a controller such as the controller shown in FIG. 1.

At 502, method 500 determines engine operating conditions. In one example, engine operating conditions included but are not limited to engine speed, engine load, ambient air pressure, brake booster pressure, master cylinder pressure, brake pedal position, intake manifold pressure, and ambient air temperature. Method 500 proceeds to 504 after engine operating conditions are determined.

At 504, method 500 judges if intake manifold pressure is lower than brake booster pressure. In one example, the brake booster pressure is determined on the master cylinder side of the brake booster diaphragm. If method 500 judges that intake manifold pressure is higher than brake booster pressure, method 500 exits. Otherwise, method 500 proceeds to 506.

At 506, method 500 determines air flow from the brake booster to the intake manifold. In one example, air flow is determined in response to a pressure difference between the brake booster and the intake manifold. The air flow between the brake booster and the intake manifold may be empirically determined and stored in a table or function that is indexed by brake booster vacuum and intake manifold pressure. The output of the table corresponds to an air flow rate. In another example, a sonic orifice as shown in FIG. 4a may be placed in a conduit between the brake booster and the intake manifold. The air flow rate through the orifice can be determined from the pressure ratio across the orifice.

In another example, air flow from the brake booster may be determined by subtracting a chemical based engine air flow rate from an air meter measurement of engine air flow rate. For example, the brake booster to intake manifold flow rate can be determined from the equation: MAF−(UEGO_Lambda*$A/F_S$*fuel flow*KAM_REF). Where MAF is the air meter engine air flow, UEGO_Lambda is the exhaust gas engine lambda (where lambda is $(A/F)/(A/F_S)$), $A/F_S$ is the stoichiometric air-fuel ratio, fuel flow is the amount of fuel injected to the engine, and KAM_REF is an adaptive correction factor.

In still another example, air flow from the brake booster may be determined by subtracting a speed/density air flow estimate from a throttle based air flow estimate. For example, the speed density air flow is determined from the ideal gas law, intake manifold pressure, intake manifold temperature, and a volumetric efficiency table. The throttle air flow is determined from a function that describes throttle flow based on the pressure ratio across the throttle body and the throttle position. Method 500 proceeds to 508 after air flow from the brake booster to the intake manifold is determined.

At 508, method 500 adjusts an actuator to limit or substantially maintain intake manifold pressure. By limiting or substantially maintaining intake manifold pressure it is possible to control engine torque so that the vehicle operator does not sense a change in engine operation caused by air flowing from the brake booster to the engine intake manifold. In addition, when a change in intake manifold pressure is limited, or when engine manifold pressure is substantially maintained, engine air-fuel may be controlled such that the exhaust gas oxygen concentration does not go leaner or richer than is desired.

In one example, a position of an engine intake throttle can be adjusted in response to a change in air flow from the brake booster to the intake manifold. In other examples, EGR valves, PCV valves, cam timing, or a throttle bypass valve may be adjusted. The position of the actuator can be adjusted in proportion to the air flow determined at 506. If an intake throttle is adjusted, the position of the throttle plate can reduce the throttle opening area so that less air is inducted to the engine via the throttle. In particular, the throttle position can be adjusted based on a pressure ratio across the throttle to reduce the air flow rate through the throttle. The amount of the throttle position adjustment corresponding to a flow characterization of the throttle stored in a controller memory and the pressure ratio across the throttle.

The amount and rate that the actuator is adjusted during air flow from the brake booster to the intake manifold may be adapted. In one example, a desired intake manifold pressure during air flow from the brake booster to the intake manifold can be compared to the actual or measured intake manifold pressure. In particular, an error signal can be provided by subtracting the actual intake manifold pressure from the desired intake manifold pressure. The actuator closing command can be adjusted to reduce the actuator closing amount when the intake manifold pressure is less than the desired intake manifold pressure. The actuator closing command can be adjusted to increase the actuator closing amount when the intake manifold pressure is greater than the desired intake manifold pressure. In this way, the actuator closing adjustment can be adapted for different engines. Method 500 proceeds to 510 after adjusting an actuator to adjust air flow into the engine in response to flow from the brake booster to the intake manifold.

At 510, method 500 judges whether spark timing can be advanced to enable lower intake manifold pressure or retarded spark to compensate for increased MAP. In one example, method 500 determines if spark can be advanced so that the throttle or other actuator can be closed further to lower intake manifold pressure and increase flow from the brake booster to the intake manifold based on the desired torque, intake manifold pressure, engine speed, and present spark advance. In particular, the engine spark advance can be increased in increments up to an engine knock limit that is empirically determined and stored in memory. For example, if an engine is at idle and operating at spark timing retarded from MBT spark timing, spark can be advanced and the throttle closed to provide lower intake manifold pressure while substantially maintaining engine torque.

On the other hand, if an increase in engine intake manifold pressure is observed, spark is retarded to provide a desired amount of engine torque (e.g., substantially maintaining engine torque). For example, if an engine is at idle operating at a spark timing retarded from MBT spark timing, and intake manifold pressure increases from air flowing from the brake booster to the intake manifold, spark timing can be further retarded to provide a desired amount of engine torque (e.g., substantially maintaining engine torque). If spark can be adjusted, method 500 proceeds to 512. Otherwise, method 500 proceeds to exit.

At 512, method 500 advances or retards spark by a predetermined amount while observing output from an engine knock sensor. If the knock sensor does not indicate the presence of knock, the engine spark can be advanced. If spark is being retarded the amount of spark retard may be limited in response to a decrease in engine speed. Spark can be advanced until knock is sensed or until a desired intake manifold pressure is reached. Further, while spark is advancing a throttle or other actuator continues to reduce air flow to the engine. Further still, spark advance may be adjusted in response to a rate of change in the brake booster to intake manifold air flow rate. For example, spark may be retarded at a rate of 0.5 degrees per second when the brake booster to intake manifold air flow rate is 0.001 Kg/hr, and spark may be retarded at a rate of 1 degree per second when the brake booster to intake manifold air flow rate is 0.0015 Kg/hr. In one example, engine air flow reduction is limited to a desired level of combustion stability. Method 500 exits after adjusting engine spark.

Referring now to FIG. 6, a flowchart of a method for compensating for air flow from a brake booster is shown. The method of FIG. 6 is executable by a controller such as the controller shown in FIG. 1.

At 602, method 600 determines engine operating conditions. In one example, engine operating conditions included but are not limited to engine speed, engine load, ambient air pressure, brake booster vacuum, master cylinder pressure, brake pedal position, intake manifold pressure, and ambient air temperature. Method 600 proceeds to 604 after engine operating conditions are determined.

At 604, method 600 judges if intake manifold pressure is lower than brake booster pressure. In one example, the brake booster pressure is determined on the master cylinder side of the brake booster diaphragm. If method 600 judges that intake manifold pressure is higher than brake booster pressure, method 600 exits. Otherwise, method 600 proceeds to 606.

At 606, method 600 determines air flow from the brake booster to the intake manifold. In one example, air flow is determined in response to a pressure difference between the brake booster and the intake manifold. The air flow between the brake booster and the intake manifold may be empirically determined and stored in a table or function that is indexed by brake booster vacuum and intake manifold pressure. The output of the table corresponds to an air flow rate. In another example, a sonic orifice as shown in FIG. 4E may be placed in a conduit between the brake booster and the intake manifold. The air flow rate through the orifice can be determined from the pressure ratio across the orifice. Method 600 proceeds to 608 after air flow from the brake booster to the intake manifold is determined.

At 608, method 600 adds the amount of air flow from the brake booster to the intake manifold to the present engine air amount. For example, if the engine has an engine air flow rate of 0.750 Kg/hr and the brake booster to intake manifold air flow rate is 0.002 Kg/hr, then the engine air flow rate is adjusted to 0.752 Kg/hr when the brake booster to intake manifold air flow rate is added to the engine air flow rate. Thus, method 600 allows the engine manifold pressure to change with changing air flow from the brake booster to the intake manifold. The desired engine air-fuel ratio is maintained by increasing the amount of fuel injected in accordance with the amount of air flowing from the brake booster to the intake manifold. In this way, the engine exhaust gas concentration may be maintained at a desired level even though the amount of air entering the engine is increasing when there is air flow from the brake booster to the intake manifold. Method 600 proceeds to 610 after the engine air amount is adjusted.

At 610, method 600 adjusts engine torque to account for the increased engine air amount and fuel amount. An increase in engine air amount from air flowing from the brake booster to the engine intake manifold can increase the engine torque beyond the desired engine torque when fuel is added to the brake booster to engine intake air flow. Method 600 adjusts for the increase in air and fuel by retarding spark. In one example, the increase in engine torque can be determined from the increase in engine air amount. Thus, at a given engine speed and air-fuel ratio, an increase in engine torque can be computed based on the air flow from the brake booster to the intake manifold. Further, a function relating spark retard to engine torque is used to retard spark timing so that engine torque remains substantially constant when air flows from the brake booster to the engine intake manifold. In this way, engine spark timing can be adjusted to compensate for the change in engine torque.

In another example, cam timing can be adjusted to compensate for the additional air flow into the engine. For example, the exhaust valve timing can be advanced so that the exhaust valve opens early and releases exhaust gases, thereby reducing the engine efficiency so that engine torque is maintained at a desired level. Method 600 proceeds to exit after adjusting engine torque in response to adjusted engine air amount.

Figure 7:
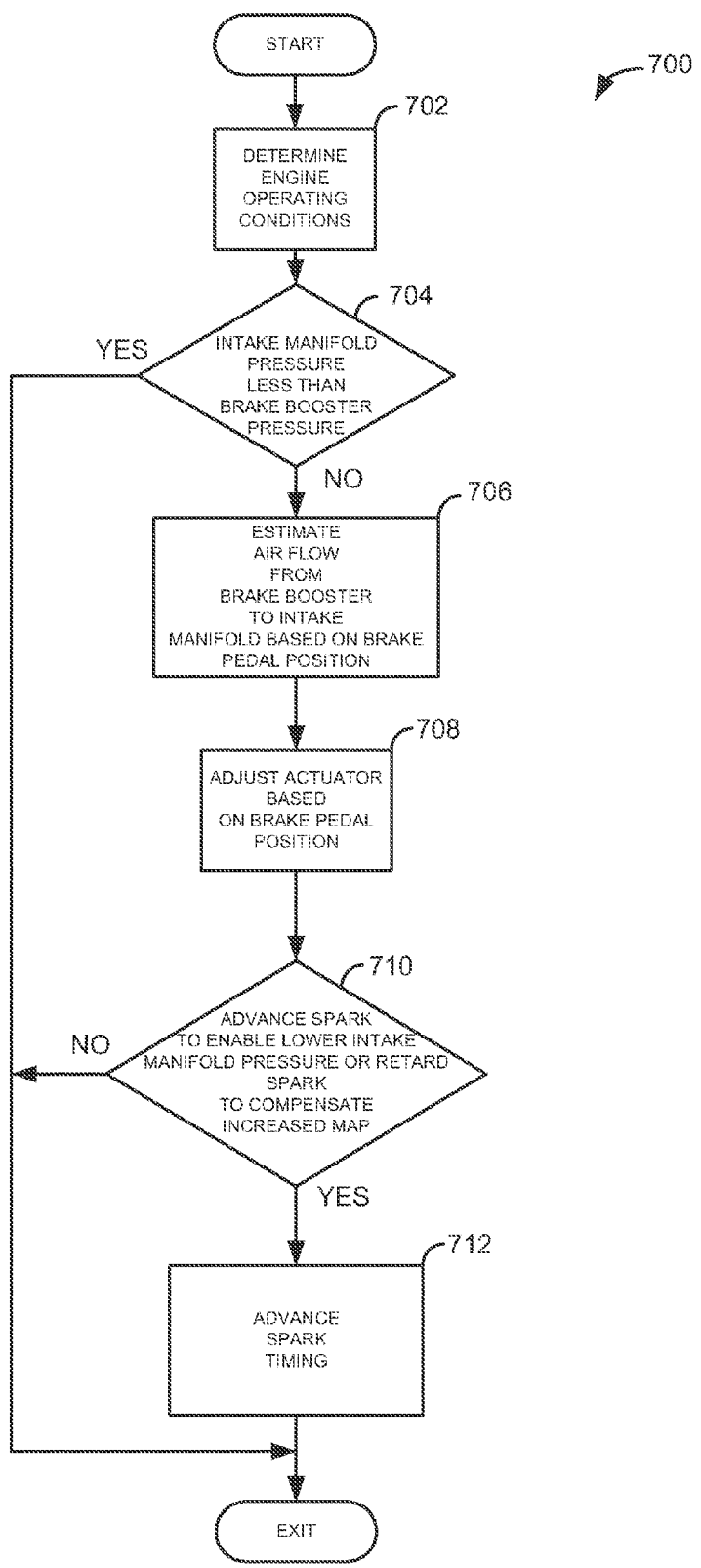
FIG. 7 shows a flowchart of a third example method for compensating for air flow from a brake booster to an engine air intake system.

Referring now to FIG. 7, a third method for compensating air flow from a brake booster is shown. The method of FIG. 7 is executable by a controller such as the controller shown in FIG. 1.

At 702, method 700 determines engine operating conditions. In one example, engine operating conditions included but are not limited to engine speed, engine load, ambient air pressure, brake booster vacuum, master cylinder pressure, brake pedal position, intake manifold pressure, and ambient air temperature. Method 700 proceeds to 704 after engine operating conditions are determined.

At 704, method 700 judges if there is a change in brake actuator position. In one example, the brake pedal position is determined from a position sensor coupled to the vehicle brake pedal. The brake pedal position sensor outputs a signal proportional to the movement of the brake pedal. If method 700 judges that there is no change is brake actuator position, method 700 exits. Otherwise, method 700 proceeds to 706.

At 706, method 700 determines air flow from the change in brake actuator position. In one example, air flow is determined as a function of the change in brake pedal position. For example, brake pedal position is mapped to a brake booster volume. In one example, a function stored in controller memory relates brake position with brake booster vacuum chamber volume. When the brake is depressed a change in brake booster vacuum can be determined from the change in brake booster volume using the ideal gas law. Similarly, when the brake is released a change in brake booster vacuum can be determined from the change in brake booster volume and atmospheric pressure. In one example, increasing brake force is correlated to brake position by an empirically determined function stored in memory. Thus, as an alternative to a brake pedal position sensor, brake force or hydraulic master cylinder brake pressure can be empirically mapped with a change in brake booster pressure so that flow from the brake booster to the engine intake manifold can be determined. Decreasing brake force is correlated to atmospheric air entering the brake booster on the brake pedal side of the brake booster diaphragm. Method 700 proceeds to 708 after air flow from the brake booster to the intake manifold is determined.

At 708, method 700 adjusts an actuator to limit or substantially maintain intake manifold pressure. By limiting or substantially maintaining intake manifold pressure it is possible to control engine torque so that the vehicle operator does not sense a change in engine operation caused by air flowing from the brake booster to the engine intake manifold. In addition, when a change in intake manifold pressure is limited or when engine manifold pressure is substantially maintained, engine air-fuel may be controlled such that the exhaust gas oxygen concentration does not go leaner or richer than is desired.

In one example, a position of an engine intake throttle can be adjusted in response to a change in air flow from the brake booster to the intake manifold. In other examples, EGR valves, PCV valves, cam timing, or a throttle bypass valve may be adjusted. The position of the actuator can be adjusted in proportion to the air flow determined at 706. In another example, the position of the actuator may be adjusted in proportion to the position of the brake. If an intake throttle is adjusted, the position of the throttle plate can reduce the throttle opening area so that less air is inducted to the engine via the throttle. In particular, the throttle position can be adjusted based on a pressure ratio across the throttle to reduce the air flow rate through the throttle. The amount of the throttle position adjustment corresponding to a flow characterization of the throttle stored in a controller memory and the pressure ratio across the throttle.

The amount and rate that the actuator is adjusted during air flow from the brake booster to the intake manifold may be adapted. In one example, a desired intake manifold pressure during air flow from the brake booster to the intake manifold can be compared to the actual or measured intake manifold pressure. In particular, an error signal can be provided by subtracting the actual intake manifold pressure from the desired intake manifold pressure. The actuator closing command can be adjusted to reduce the actuator closing amount when the intake manifold pressure is less than the desired intake manifold pressure. The actuator closing command can be adjusted to increase the actuator closing amount when the intake manifold pressure is greater than the desired intake manifold pressure. In this way, the actuator closing adjustment can be adapted for different engines. Method 700 proceeds to 710 after adjusting an actuator to adjust air flow into the engine in response to flow from the brake booster to the intake manifold.

At 710, method 700 judges whether spark timing can be advanced to enable lower intake manifold pressure or retarded to compensate for increased intake manifold pressure. In one example, method 700 determines if spark can be advanced so that the throttle or other actuator can be closed further to increase flow from the brake booster to the intake manifold based on the desired torque, intake manifold pressure, engine speed, and present spark advance. In particular, the engine spark advance can be increased in increments up to an engine knock limit that is empirically determined and stored in memory.

On the other hand, if an increase in engine intake manifold pressure is observed, spark is retarded to provide a desired amount of engine torque (e.g. substantially maintaining engine torque). If spark can be advanced, method 700 proceeds to 712. Otherwise, method 700 proceeds to exit.

At 712, method 700 advances spark or retards spark by a predetermined amount while observing output from an engine knock sensor. If the knock sensor does not indicate the presence of knock, the engine spark can be advanced. If spark is being retarded the amount of spark retard may be limited in response to a decrease in engine speed. Spark can be advanced until knock is sensed or until a desired intake manifold pressure is reached. Further, while spark is advancing a throttle or other actuator continues to reduce air flow to the engine. Further still, spark advance may be adjusted in response to a rate of change in the brake booster to intake manifold air flow rate. In one example, engine air flow reduction is limited to a desired level of combustion stability. Method 700 exits after adjusting engine spark.

Thus, the method of FIGS. 5-7 provide for an engine operating method, comprising: adjusting an actuator to substantially maintain an engine intake manifold pressure in response to a brake booster to intake manifold flow rate when brake booster vacuum changes, the brake booster vacuum change in response to a change in a position of a brake pedal. The engine operating method includes where the actuator is one of an intake throttle, an EGR valve, PCV valve, and a throttle bypass valve. The engine operating method includes where the brake booster to intake manifold flow rate is determined from a brake boost pressure sensor and an intake manifold pressure sensor. The engine operating method includes where the actuator is at least partially closed in response to an increase in flow from the brake booster to an intake manifold. The engine operating method further comprises adjusting engine spark advance in response to a rate of change in the brake booster to intake manifold flow rate. The engine operating method further comprises adapting adjusting the actuator in response to intake manifold pressure observed when adjusting the actuator to substantially maintain the engine intake manifold pressure. The engine operating method including where the actuator is closed when a depression of the brake pedal causes brake booster pressure to increase, and where the actuator is closed when release of the brake pedal causes brake booster pressure to increase.

The methods of FIGS. 5-7 also provide for an engine operating method, comprising: operating a boosted engine; during a first engine operating condition when the boosted engine is operating with a positive intake manifold pressure, not adjusting an actuator in response to a position of a brake; and during a second engine operating condition when the boosted engine is operating with a negative intake manifold pressure, adjusting an actuator to substantially maintain an engine torque in response to a position of a brake pedal. The engine operating method includes where an engine air amount is adjusted in proportion to the position of the brake pedal. The engine operating method including where the engine is turbocharged and where the actuator is adjusted by a greater amount when the brake pedal is released as compared to when the brake pedal is applied during a single braking event. The engine operating method including where the adjusting of the actuator is in further response to brake temperature. The engine operating method includes where the adjusting of the actuator is in further response to estimated brake position. The engine operating method including where brake force is estimated from hydraulic brake pressure and brake booster vacuum.

As will be appreciated by one of ordinary skill in the art, the method described in FIGS. 5-7 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method, comprising:
   operating an engine;
   adjusting an intake throttle to substantially maintain an intake manifold pressure of the engine in response to a brake booster to intake manifold flow rate when brake booster vacuum changes, the brake booster vacuum change in response to a change in a position of a brake pedal; and
   adjusting engine spark advance in response to the brake booster to intake manifold flow rate.

2. The method of claim 1, where the brake booster to intake manifold flow rate is determined from a brake boost pressure sensor and an intake manifold pressure sensor.

3. The method of claim 1, where the intake throttle is at least partially closed in response to an increase in flow from a brake booster to an intake manifold.

4. The method of claim 1, further comprising adapting a rate the intake throttle is adjusted.

5. The method of claim 1, further comprising adjusting the intake throttle in response to intake manifold pressure observed when adjusting the intake throttle to substantially maintain the engine intake manifold pressure.

6. The method of claim 1, where the intake throttle is closed when brake pedal depression causes brake booster pressure to increase, and when brake pedal release causes brake booster pressure to increase.

7. An engine operating method, comprising:
operating a boosted engine;
during a first engine operating condition when the boosted engine is operating with a positive intake manifold pressure, not adjusting an intake throttle in response to a brake pedal position; and
during a second engine operating condition when the boosted engine is operating with a negative intake manifold pressure, adjusting the intake throttle to substantially maintain an engine torque in response to the brake pedal position.

8. The engine operating method of claim 7, where an engine air amount is adjusted in proportion to the position of the brake pedal.

9. The engine operating method of claim 7, where the engine is turbocharged and where the intake throttle is adjusted by a greater amount when the brake pedal is released as compared to when the brake pedal is applied during a single braking event.

10. The engine operating method of claim 7, where brake position is inferred from a master cylinder pressure.

11. The engine operating method of claim 7, where the adjusting of the intake throttle is in further response to estimated brake force.

12. The engine operating method of claim 11, where brake force is estimated from hydraulic brake pressure and brake booster vacuum.

13. An engine system, comprising:
an engine having an intake manifold;
a first sensor configured to sense an attribute of air in an intake system of the engine;
a brake booster;
a second sensor configured to sense a pressure of the brake booster;
a conduit coupling the intake manifold and the brake booster;
a venturi or a sonic choke positioned along the conduit;
an intake throttle coupled to the engine; and
a controller, the controller including non-transitory instructions for adjusting the intake throttle in response to a flow estimated with the first and second sensors.

14. The engine system of claim 13, where the first sensor is a hot wire air flow meter.

15. The engine system of claim 13, where the first sensor is an intake manifold pressure sensor.

16. The engine system of claim 13, where the controller includes further instructions for adjusting engine spark in response to the flow estimated with the first and second sensors.

17. The engine system of claim 13, where the controller includes further instructions for substantially maintaining engine torque when adjusting the intake throttle.

18. The engine system of claim 13, where the controller includes further instructions for closing the intake throttle when brake booster pressure rises in response to depressing a brake pedal, and where the controller includes further instructions for closing the intake throttle when brake booster pressure rises in response to releasing the brake pedal.

* * * * *